US011181938B2

(12) United States Patent
Fung

(10) Patent No.: US 11,181,938 B2
(45) Date of Patent: *Nov. 23, 2021

(54) FULL BODY MOVEMENT CONTROL OF DUAL JOYSTICK OPERATED DEVICES

(71) Applicant: Blue Goji LLC, Austin, TX (US)

(72) Inventor: Coleman Fung, Spicewood, TX (US)

(73) Assignee: Blue Goji LLC, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/749,498

(22) Filed: Jan. 22, 2020

(65) Prior Publication Data

US 2020/0159277 A1 May 21, 2020

Related U.S. Application Data

(63) Continuation-in-part of application No. 15/193,112, filed on Jun. 27, 2016, now abandoned, and a continuation-in-part of application No. 15/187,787, filed on Jun. 21, 2016, now Pat. No. 10,124,255, which is a continuation-in-part of application No. 15/175,043, filed on Jun. 7, 2016, now Pat. No. 9,766,696, application No. 16/749,498, which is a continuation-in-part of application No. 15/193,112, filed on Jun. 27, 2016, now abandoned, which is a continuation-in-part of application No. 15/187,787, filed on Jun. 21, 2016, now Pat. No. 10,124,255, which is a continuation-in-part of application No. 14/846,966, filed on Sep. 7, 2015, now Pat. No. 10,080,958, and a continuation-in-part of application No. 14/012,879, filed on Aug. 28, 2013, now Pat. No. 10,737,175.

(Continued)

(51) Int. Cl.
G05G 9/047 (2006.01)
A63F 13/24 (2014.01)

(52) U.S. Cl.
CPC ............. G05G 9/047 (2013.01); A63F 13/24 (2014.09); G05G 2009/04718 (2013.01)

(58) Field of Classification Search
CPC .......... A63F 13/42; A63F 13/35; A63F 13/24; G06F 3/011; G05G 9/047
See application file for complete search history.

(56) References Cited

U.S. PATENT DOCUMENTS

2005/0212753 A1* 9/2005 Marvit ................. G06F 16/176
345/156
2007/0171199 A1* 7/2007 Gosselin ................ A61B 3/008
345/156

(Continued)

Primary Examiner — Tim T Vo
Assistant Examiner — Phong H Dang
(74) Attorney, Agent, or Firm — Galvin Patent Law LLC; Brian R. Galvin; Brian S. Boon

(57) ABSTRACT

A system and method for full body movement control of dual joystick operated devices. The system uses two motion sensors: a first motion sensor for body lean and tilt, and a second motion sensor for head rotation and tilt. The output from the first motion sensor is converted into a virtual joystick output signal corresponding to a first standard joystick which controls one aspect of movement, and the output from the second motion sensor is converted into a virtual joystick output signal corresponding to a second standard joystick which controls a different aspect of movement.

8 Claims, 13 Drawing Sheets

Related U.S. Application Data

(60) Provisional application No. 62/330,602, filed on May 2, 2016, provisional application No. 62/310,568, filed on Mar. 18, 2016, provisional application No. 61/696,068, filed on Aug. 31, 2012.

(56) References Cited

U.S. PATENT DOCUMENTS

| | | | | |
|---|---|---|---|---|
| 2010/0113222 A1* | 5/2010 | Radow | A63B 24/00 | 482/5 |
| 2011/0009241 A1* | 1/2011 | Lane | A63B 24/0087 | 482/8 |
| 2011/0034300 A1* | 2/2011 | Hall | A63B 5/11 | 482/1 |
| 2012/0313935 A1* | 12/2012 | Bocq | G06F 3/04883 | 345/419 |
| 2013/0038601 A1* | 2/2013 | Han | G06F 3/011 | 345/419 |
| 2014/0309035 A1* | 10/2014 | Crawford | A63F 13/803 | 463/36 |
| 2017/0095732 A1* | 4/2017 | Ghaffari | A63F 13/67 | |

* cited by examiner

FULL BODY MOVEMENT CONTROL OF DUAL JOYSTICK OPERATED DEVICES

CROSS-REFERENCE TO RELATED APPLICATIONS

| Application No. | Date Filed | Title |
|---|---|---|
| Current application | Herewith | FULL BODY MOVEMENT CONTROL OF DUAL JOYSTICK OPERATED DEVICES |
| | | Is a continuation-in-part of: |
| 15/193,112 | Jun. 27, 2016 | NATURAL BODY INTERACTION FOR MIXED OR VIRTUAL REALITY APPLICATIONS |
| | | which claims benefit of and priority to: |
| 62/330,602 | May 2, 2016 | NATURAL BODY INTERACTION FOR MIXED OR VIRTUAL REALITY APPLICATIONS |
| | | and is also a continuation-in-part of: |
| 15/187,787 Patent 10,124,255 | Jun. 21, 2016 Issue Date Nov. 13, 2018 | MULTIPLE ELECTRONIC CONTROL AND TRACKING DEVICES FOR MIXED-REALITY INTERACTION |
| | | which is a continuation-in-part of: |
| 15/175,043 Patent 9,766,696 | Jun. 7, 2016 Issue Date Sep. 19, 2017 | APPARATUS FOR NATURAL TORSO TRACKING AND FEEDBACK FOR ELECTRONIC INTERACTION |
| | | which claims benefit of, and priority to: |
| 62/310,568 | Mar. 18, 2016 | APPARATUS FOR NATURAL TORSO TRACKING AND FEEDBACK FOR ELECTRONIC INTERACTION |
| Current application | Herewith | FULL BODY MOVEMENT CONTROL OF DUAL JOYSTICK OPERATED DEVICES |
| | | Is a continuation-in-part of: |
| 15/193,112 | Jun. 27, 2016 | NATURAL BODY INTERACTION FOR MIXED OR VIRTUAL REALITY APPLICATIONS |
| | | which is a continuation-in-part of: |
| 15/187,787 Patent 10,124,255 | Jun. 21, 2016 Issue Date Nov. 13, 2018 | MULTIPLE ELECTRONIC CONTROL AND TRACKING DEVICES FOR MIXED-REALITY INTERACTION |
| | | which is a continuation-in-part of: |
| 14/846,966 Patent 10,080,958 | Sep. 7, 2015 Issue Date Sep. 25, 2018 | MULTIPLE ELECTRONIC CONTROL DEVICES |
| | | and is also a continuation-in-part of: |
| 14/012,879 | Aug. 28, 2013 | Mobile and Adaptable Fitness System |
| | | which claims benefit of, and priority to: |
| 61/696,068 | Aug. 31, 2012 | Mobile and Adaptable Fitness System | the entire specification of each of which is incorporated herein by reference.

BACKGROUND OF THE INVENTION

Field of the Art

The disclosure relates to the field of electronic devices, and more particularly to the field of control input devices.

Discussion of the State of the Art

The dual joystick controller has become a standard input device in a number of fields. In computer gaming, a single piece handheld controller with dual thumb joysticks is very common, with less common variants being two separate handheld controllers, each with a thumb joystick. Joystick controllers with dual thumb joysticks are also standard for controlling model airplanes and aerial drones. In other fields, such as control of construction equipment, dual full-hand joystick controllers can be used to control small wheeled and tracked loaders.

These implementations of dual joystick controllers are useful, but they have a significant drawback from the standpoint of health and exercise. These devices all use just the muscles of the hands and wrists, and require the use of fine motor skills. As a result, they all but require the user to remain stationary during use, discouraging movement and activity.

There are also existing systems that allow for other than dual joystick controller input, such as virtual reality (VR) headsets and hand-held motion-sensing wand controllers, but all such existing systems still have substantial drawbacks. VR headsets are cumbersome as they must hold a viewing screen in front of the eyes. As a result, they cannot be used while exercising vigorously. VR hand-held controllers still require the use of fine motor skills. Further, VR headsets only allow the equivalent of operation of a single joystick, typically controlling the camera angle within computer games, and therefore must be paired with at least one hand-held controller to allow the equivalent of operation of a second joystick, typically controlling movement of an in-game avatar. Third, the systems and games for VR headsets and wands must be specially designed and programmed to allow the user of VR headsets, which limits accessibility to many users.

What is needed is a system that enables a user to engage in full body movement while retaining the benefits of standardized dual joystick controls and without requiring the use of hand-held controllers.

SUMMARY OF THE INVENTION

Accordingly, the inventor has conceived and reduced to practice a system and method for full body movement control of dual joystick operated devices. The system comprise separates motion sensors: a first motion sensor for body lean and tilt, and a second motion sensor for head rotation and tilt. The output from the first motion sensor is converted into a virtual joystick output signal corresponding to a first standard joystick which controls one aspect of movement, and the output from the second motion sensor is converted into a virtual joystick output signal corresponding to a second standard joystick which controls a different aspect of movement. In this way, a user of the system is free to engage exercise, balance activities, and other full-body movements, while using body movements and head movements to control a game or device designed for control by a standard dual joystick controller. Thus, the user enjoys health, fitness, balance, engagement, and interactivity benefits while being able to use standard games and devices designed for dual joystick controllers.

According to a preferred embodiment, a system for full body movement control of dual joystick operated devices is disclosed, comprising: a first motion sensing device configured to detect motion comprising a lean angle and a tilt angle of the torso of a user and transmit a first data stream to a composition server; and a second motion sensing device configured to detect motion comprising a rotation angle and tilt angle of the head of a user and transmit a second data stream to a composition server; and a third motion sensing device configured to detect motion comprising a direction of motion of a limb of a user and transmit a third data stream to a composition server; and a composition server comprising at least a plurality of programming instructions stored in a memory and operating on a processor of a network-connected computing device and configured to: receive the first data stream from the first motion sensing device; receive the second data stream from the second motion sensing device; receive the third data stream from the third motion sensing device; create a first virtual joystick output wherein the lean angle and the tilt angle of the torso of the user corresponds to a direction of a first joystick; create a second virtual joystick output wherein the rotation angle and tilt angle of the head of the user corresponds to a direction of a second joystick; create a third virtual joystick output wherein the direction of motion of a limb corresponds to a button push of a joystick; convert each virtual joystick output into a format that would be recognized as a standard joystick output by a device configured to accept a standard joystick output; and send each virtual joystick output to the device.

According to another preferred embodiment, a method for full body movement control of dual joystick operated devices is disclosed, comprising the steps of: capturing data from a first motion sensing device configured to detect motion comprising a lean angle and a tilt angle of the torso of a user and transmitting a first data stream to a composition server; and capturing data from a second motion sensing device configured to detect motion comprising a rotation angle and tilt angle of the head of a user and transmitting a second data stream to a composition server; and capturing data from a third motion sensing device configured to detect motion comprising a direction of motion of a limb of a user and transmitting a third data stream to a composition server; and using a composition server comprising at least a plurality of programming instructions stored in a memory and operating on a processor of a network-connected computing device to perform the additional steps of: receiving the first data stream from the first motion sensing device; receiving the second data stream from the second motion sensing device; receiving the third data stream from the third motion sensing device; creating a first virtual joystick output wherein the lean angle and the tilt angle of the torso of the user corresponds to a direction of a first joystick; creating a second virtual joystick output wherein the rotation angle and tilt angle of the head of the user corresponds to a direction of a second joystick; creating a third virtual joystick output wherein the direction of motion of a limb corresponds to a button push of a joystick; converting each virtual joystick output into a format that would be recognized as a standard joystick output by a dual joystick operated device.

According to an aspect of an embodiment, the dual joystick operated device is a computer game.

According to an aspect of an embodiment, the lean angle of the first virtual joystick controls left and right movement of an in-game avatar and the tilt angle of the first virtual joystick controls forward and backward movement of the in-game avatar, and the rotation angle of the second virtual joystick controls the left and right view control in the game and the tilt angle of the first virtual joystick controls up and down view control in the game.

According to an aspect of an embodiment, the dual joystick operated device is a radio-controlled aircraft or drone.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
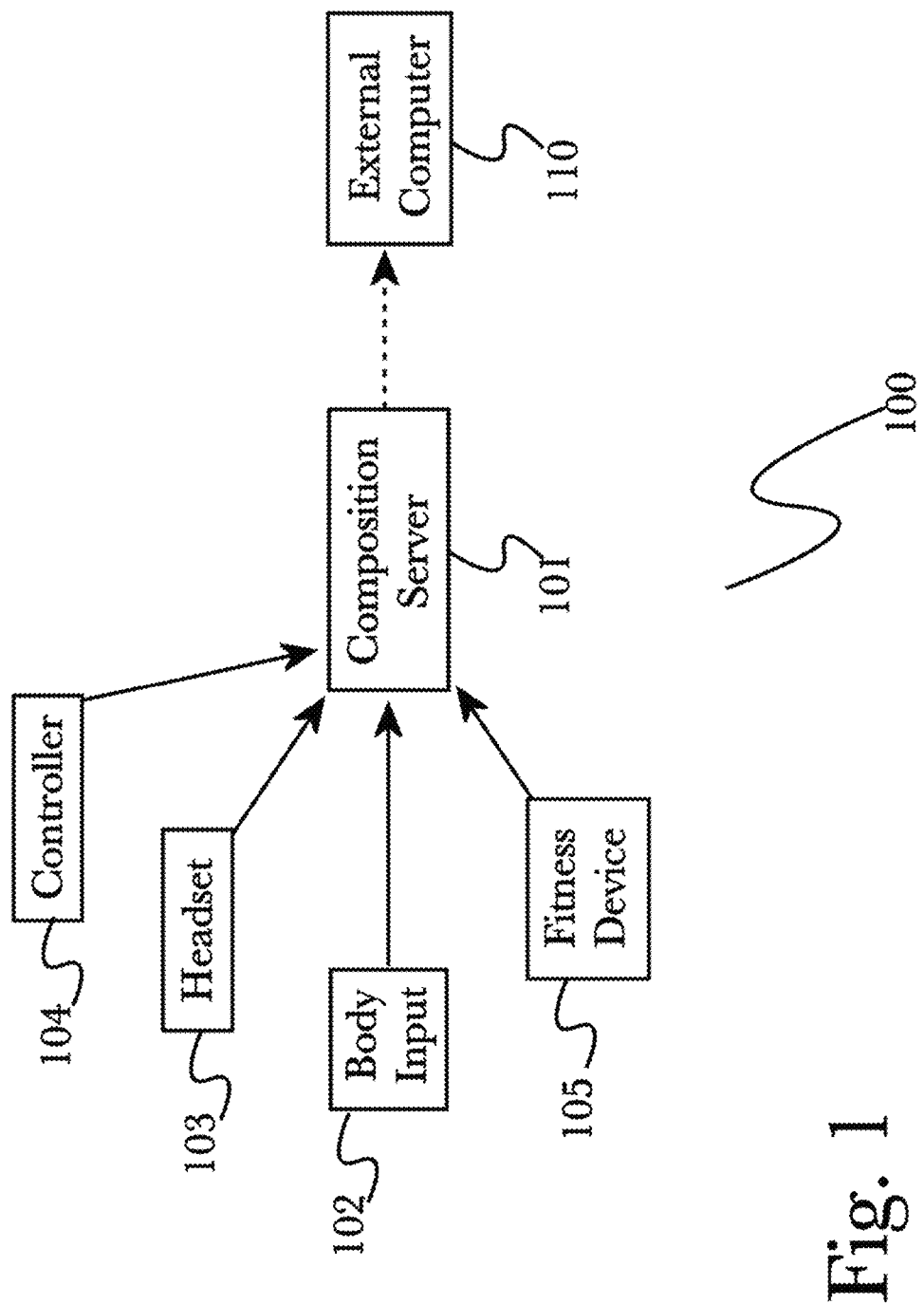
FIG. 1 is a block diagram of an exemplary system architecture for natural body interaction for mixed or virtual reality applications, according to a preferred embodiment of the invention.

The inventor has conceived, and reduced to practice a system and method for full body movement control of dual joystick operated devices.

The system comprises separate motion sensors: a first motion sensor for body lean and tilt, and a second motion sensor for head rotation and tilt. The output from the first motion sensor is converted into a virtual joystick output signal corresponding to a first standard joystick which controls one aspect of movement, and the output from the second motion sensor is converted into a virtual joystick output signal corresponding to a second standard joystick which controls a different aspect of movement. Optionally, additional motion sensors may be used to capture the movement of a limb of the user, such that movement of the limb can be converted into a virtual button push. In some embodiments, different limbs may represent different buttons, or different limb movements may represent different buttons.

A user of the system is free to engage exercise, balance activities, and other full-body movements, while using body movements and head movements to control a game or device designed for control by a standard dual joystick controller. Thus, the user enjoys health, fitness, balance, engagement, and interactivity benefits while being able to use standard games and devices designed for dual joystick controllers.

Dual joystick controllers are a ubiquitous and easily-accessible means of controlling any number of devices. They are used extensively in console gaming, for example, where the left joystick is typically used to position and move the body of an in-game avatar in a 3D dimensional virtual environment. The avatar's movements corresponding to joystick movements will depend on game settings, but in a typical example when the joystick is pushed forward, the in-game avatar is moved forward in the 3D virtual space, and when the joystick is pushed left, the in-game avatar turns to the left, etc. Simultaneously, the right joystick is typically used either to position and move the in-game avatar's head (i.e. where the avatar is looking) or to position and move an in-game virtual camera that determines the view seen by the user. Again, the avatar's movements corresponding to joystick movements will depend on game settings, but in a typical example when the joystick is pushed forward, the view or look angle in the 3D virtual space moves downward (e.g., the view moves toward the "ground" in the game), and when the joystick is pushed left, view turns to the left, etc. Because of the simultaneous and separate joystick movements, it is possible to move the two joysticks such that the body of the avatar is turning left at the same rate as the view is turning right, such that movement is occurring but the user's view of the in-game environment remains the same.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

The term "virtual reality" as used herein means a computer game comprising a 3D dimensional virtual environment in which an avatar representing the user (also known as the player) of the game can interact with the virtual environment.

The terms "mixed reality" and "augmented reality" as used herein mean computer-generated objects and environments overlaid onto images of the real world.

The term "joystick" as used herein means a control device that uses a stick or lever in combination with a sensor to produce a control signal. Joysticks can be one-dimensional, but are often two dimensional. Analog joysticks produce an analog voltage that can be converted to a digital value. While digital (on/off, binary, or I/O) joysticks rely on simple electrical switches for movement in a given direction, analog sticks use potentiometers to vary a voltage along a particular axis of movement.

Conceptual Architecture

FIG. 1 is a block diagram of an exemplary system architecture 100 for natural body interaction for mixed or virtual reality applications, according to a preferred embodiment of the invention. According to the embodiment, a composition server 101 comprising programming instructions stored in a memory 11 and operating on a processor 12 of a computing device 10 (as described below, with reference to FIG. 9), may be configured to receive a plurality of input data from various connected devices. Such input devices may include (but are not limited to) a variety of hardware controller devices 104 (such as a gaming controller [such as GOJI PLAY™ controllers], motion tracking controller, or traditional computer input devices such as a keyboard or mouse), a headset device 103 such as an augmented reality or virtual reality headset (for example, OCULUS RIFT™, HTC VIVE™, SAMSUNG GEAR VR™, MICROSOFT HOLOLENS™, or other headset devices), a variety of fitness devices 105 (for example, fitness tracking wearable devices such as FITBIT™, MICROSOFT BAND™, APPLE WATCH™, or other wearable devices, or exercise machines such as a treadmill, elliptical trainer, stair-climbing machine, or other such equipment), or a variety of body input 102 tracking devices or arrangements, such as using a plurality of tethers attached to the environment and a harness worn by a user, configured to track movement and position of the user's body.

Various input devices may be connected to composition server 101 interchangeably as desired for a particular arrangement or use case, for example a user may wish to use a controller 104 in each hand and a headset 103, but omit the use of fitness devices 105 altogether. During operation, composition server 101 may identify connected devices and load any stored configuration corresponding to a particular device or device type, for example using preconfigured parameters for use as a default configuration for a new controller, or using historical configuration for a headset based on previous configuration or use. For example, a user may be prompted (or may volunteer) to provide configuration data for a particular device, such as by selecting from a list of options (for example, "choose which type of device this is", or "where are you wearing/holding this device", or other multiple-choice type selection), or composition server 101 may employ machine learning to automatically determine or update device configuration as needed. For example, during use, input values may be received that are determined to be "out of bounds", for example an erroneous sensor reading that might indicate that a user has dramatically shifted position in a way that should be impossible (for example, an erroneous reading that appears to indicate the user has moved across the room and back again within a fraction of a second, or has fallen through the floor, or other data anomalies). These data values may be discarded and configuration updated to reduce the frequency of such errors in the future, increasing the reliability of input data through use.

Composition server 101 may receive a wide variety of input data from various connected devices, and by comparing against configuration data may discard undesirable or erroneous readings as well as analyze received input data to determine more complex or fine-grained measurements. For example, combining input from motion-sensing controllers 104 with a motion-sensing headset 103 may reveal information about how a user is moving their arms relative to their head or face, such as covering their face to shield against a bright light or an attack (within a game, for example), which might otherwise be impossible to determine with any reliability using only the controllers themselves (as it may be observed that a user is raising their hands easily enough, but there is no reference for the position or movement of their head). These derived input values may then be combined into a single composite input data stream for use by various software applications, such as augmented reality or mixed or virtual reality productivity applications (for example, applications that assist a user in performing manual tasks by presenting virtual information overlays onto their field of vision, or by playing audio directions to instruct them while observing their behavior through input devices, or other such applications), or virtual reality applications or games, such as simulation games that translate a user's movement or position into in-game interaction, for example by moving a user's in-game character or avatar based on their physical movements as received from input devices. In some arrangements, composition server 101 may operate such software applications in a standalone manner, functioning as a computer or gaming console as needed. In other arrangements, composition server 101 may provide the composite data for use by an external computer 110, such as a connected gaming console, virtual reality device, personal computer, or a server operating via a network in the cloud (such as for online gaming arrangements, for example). In this manner, the composite data functions of the embodiment may be utilized with existing hardware if desired, or may be provided in a standalone package such as for demonstrations or public use, or for convenient setup using a single device to provide the full interaction experience (in a manner similar to a household gaming console, wherein all the functions of computer components may be prepackaged and setup to minimize difficulty for a new user).

Detailed Description of Exemplary Embodiments

Figure 2:
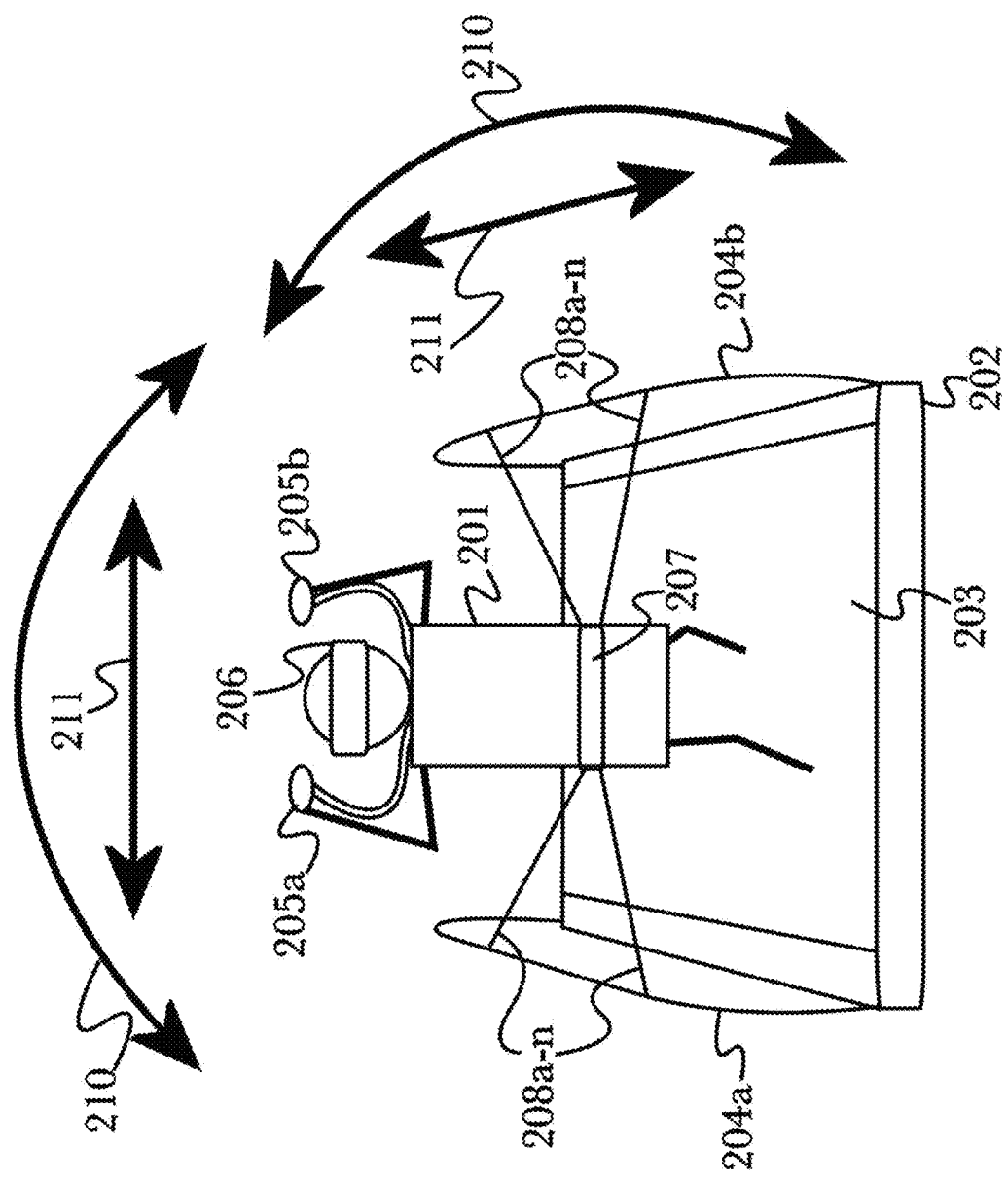
FIG. 2 is a diagram of an exemplary arrangement of a system for natural body interaction for mixed or virtual reality applications, illustrating the use of fixed controllers and body positioning on a treadmill, according to a preferred embodiment of the invention.

FIG. 2 is a diagram of an exemplary arrangement of a system 200 for natural body interaction for mixed or virtual reality applications, illustrating the use of controllers 205a-b and body positioning on a treadmill 202, according to a preferred embodiment of the invention. According to the embodiment, a user 201 may be standing, walking, or running on a treadmill or similar fitness device 202 with a moveable surface 203 (as is commonly used in exercise equipment) and handlebars or support rails 204a, 204b for a user to hold onto for safety or interaction when needed. User 201 may interact with software applications using a variety of means, including manual interaction via controller devices 205a, 205b that may be held in the hand or (as illustrated) may be affixed or integrally-formed into a treadmill 202. This may provide a user with traditional means of interacting with software applications while using treadmill 202. Additionally, a user's body position or movement may be tracked and used as input, for example via a plurality of tethers 208a, 208n affixed to handlebars 204a, 204b and a belt or harness 207 worn by user 201, or using a headset device 206 that may track the position or movement of a user's head. Body tracking may be used to recognize additional input data from user 201 (in addition to manual input via controllers 205a, 205b), by tracking the position and movement of user 201 during use. For example, motion tracking within a headset device 206 may be used to recognize a variety of translational 211 or rotational 210 movement of user's 201 head, such as leaning to the side, or looking over the shoulder. Tethers 208a, 208n may recognize a variety of movement of user's 201 torso, such as leaning, crouching, sidestepping, or other body movement. This body tracking may then be utilized as input similar to a control stick or joystick in manual controller arrangements, for example by interpreting the user's entire body as the "stick" and processing their body movements as if they were stick movements done manually.

For example, a user 201 on a treadmill 202 may be playing a virtual reality skiing game wherein they are given audio and video output via a headset 206 to immerse them in a virtual ski resort. When user 201 is not skiing, they may be able to use manual controls 205a, 205b for such operations as selecting from an on-screen menu, or typing text input such as to input their name or to chat with other players using text. When they begin skiing within the game, user 201 may be instructed in proper ski posture or technique, and may then use their body to control various aspects of their virtual skiing, such as leaning to the side 210 to alter their course and avoid trees or other skiers, or jumping 211 to clear rocks or gaps. Movement of their head may be detected by a headset 206 and used to control their view independently of their body as it is tracked by tethers 208a, 208n, allowing user 201 to look around freely without interfering with their other controls. In this manner, the user's entire body may serve as an input control device for the game, allowing and encouraging them to use natural body movements to control their gameplay in an immersive manner while still retaining the option to use more familiar manual control means as needed.

Figure 3:
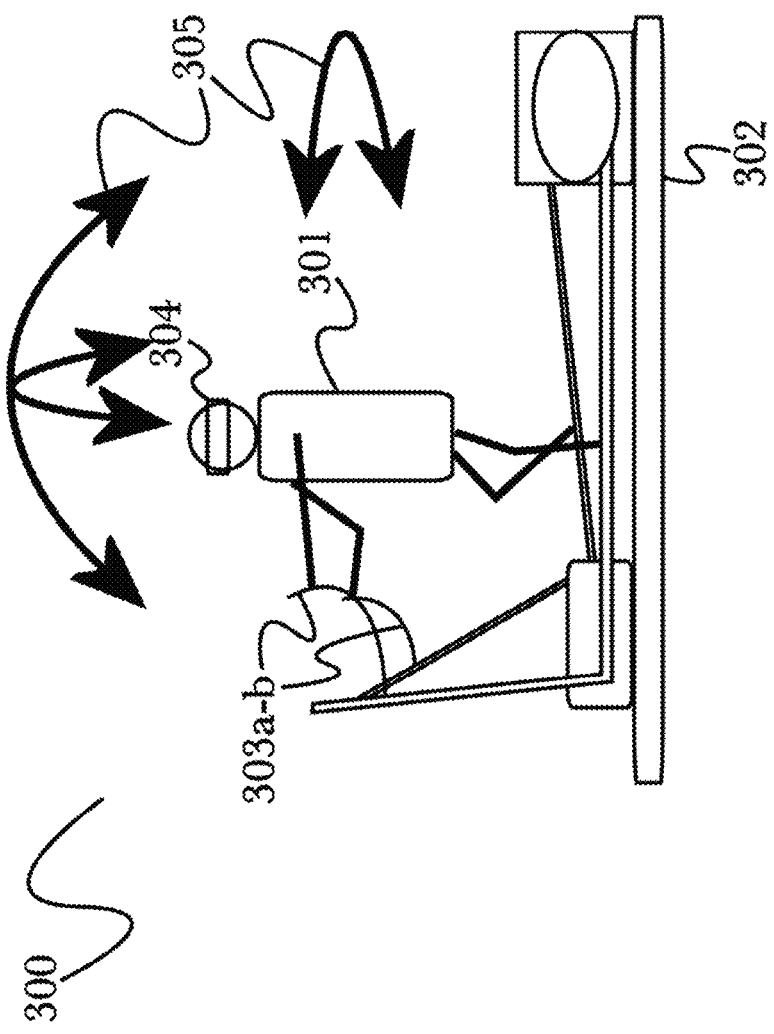
FIG. 3 is a diagram of a further arrangement of a system for natural body interaction for mixed or virtual reality applications, illustrating the use of handheld controllers and a headset on an elliptical machine, according to a preferred embodiment of the invention.

FIG. 3 is a diagram of a further arrangement of a system 300 for natural body interaction for mixed or virtual reality applications, illustrating the use of fixed controllers 303a-b and a headset 304 on an elliptical machine 302, according to a preferred embodiment of the invention. According to the embodiment, a user 301 may use an elliptical trainer 302 or similar fitness device while using a headset device 304 for mixed or virtual reality interaction. During operation, user 301 may interact manually with controller 303a-b affixed to or integrally formed as a portion of the elliptical trainer 302, and may also interact through position or movement tracking provided by headset 304 for natural body tracking. For example, a user 301 may use an elliptical trainer 302 while playing a virtual reality flight simulation game that places the user inside the cockpit of a plane during flight. User 301 may use fixed controls 303a-b to operate various aircraft controls within the game, which may feel natural as these would generally be in a fixed position relative to a seated pilot. For flying the virtual aircraft, the user may tilt 305 and move their head, providing body tracking data via headset 304, such as through onboard position or motion sensing hardware, for example a gyroscope, accelerometer, or optical tracking device. Feedback may be provided to the user in the form of exercise resistance, increasing or decreasing the difficulty of operating the elliptical machine 302 in response to events in the game or software application (for example, increasing resistance as the aircraft gains altitude in a flight simulation game, or increasing resistance as a part of increasing difficulty in a game). In this manner, the user may easily enjoy natural body input for mixed or virtual reality applications, with minimal hardware or environment setup allowing them to utilize the enhanced input functions with a variety of existing equipment, devices, or environments as desired.

Additionally, it may be appreciated that the specific arrangement or configuration of hardware devices in use may vary, for example omitting tethers (as described above, in FIG. 2) according to the nature of a fitness device 302 or environment where interaction is taking place. For example, a user may use a headset 304 to engage in body tracking for mixed or virtual reality applications using any available fitness device 302, for example to enhance their exercise at a gym where they may use any available devices and may change devices multiple times during use. In other arrangements, a user may utilize an open space such as an empty room or workspace (such as an alcove intended for a desk or cubicle), and may setup their devices in this space according to its size or layout. For example, multiple tethers may be used by affixing to walls or furniture within a reasonable distance, utilizing existing room features in place of a fitness device or exercise machine as desired.

Additionally, in some arrangements haptic feedback may be provided to further enhance immersion and natural interaction, according to the capabilities of an environment or devices used. For example, if multiple tethers are used, tension or movement may be applied to these tethers as software output, to provide physical feedback for a user during operation. As an example, a user may setup multiple tethers in an open space as described above, for use in a boxing simulation game. During gameplay, sudden "jerking" tension may be applied to one or more tethers, to simulate a "knock-back" effect from an opponent's blow, or constant tension may be applied to restrain a user's movements during grappling. In another example, a user may be playing a virtual reality flight simulator as described previously (referring to FIG. 3), and tethers may be used to restrain the user's movement within the virtual aircraft cockpit by applying tension to "strap them in" as though they were seated and buckled into a pilot's chair. Additional momentary tension may be utilized to simulate external forces such as G-forces during maneuvers, or impacts to the user's aircraft.

Figure 4:
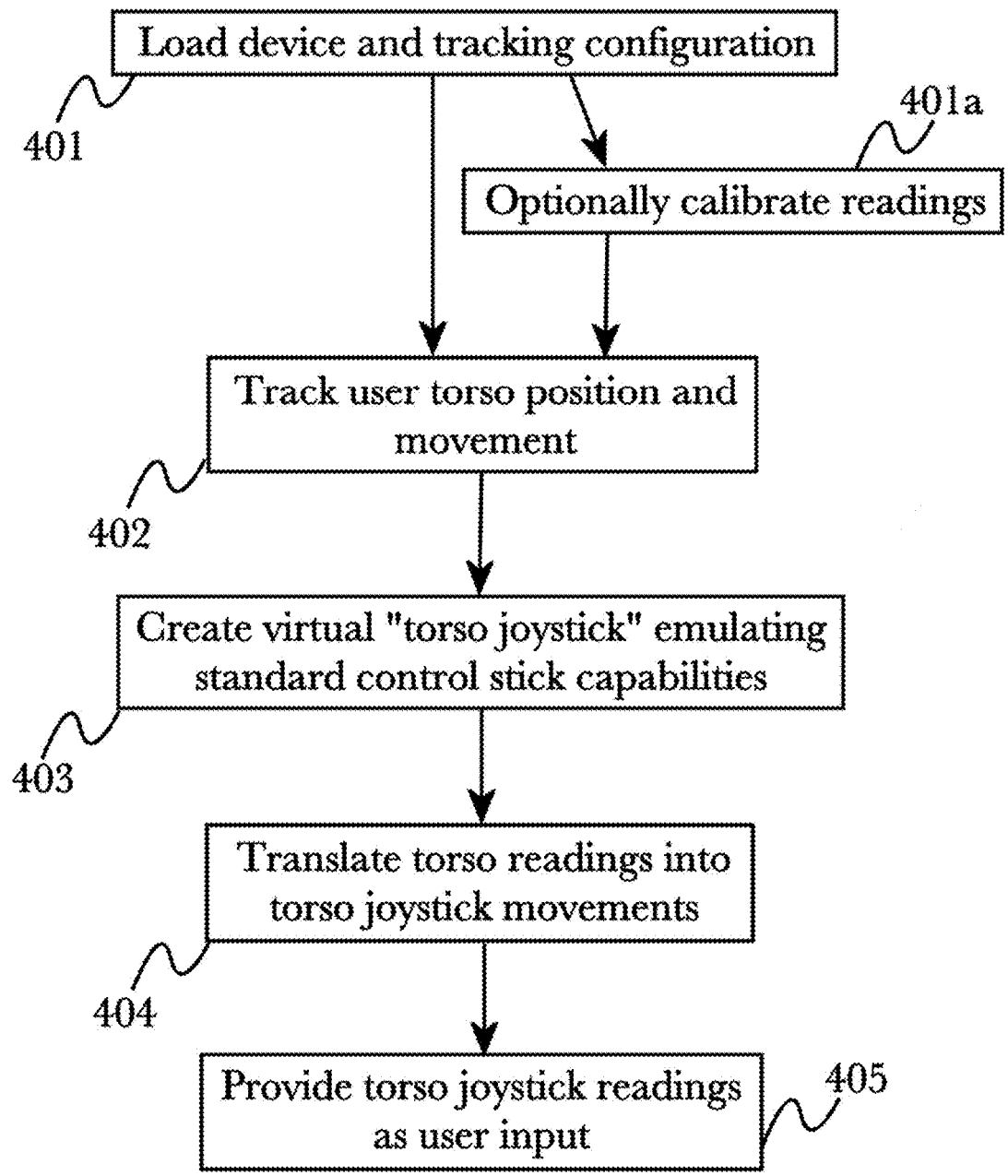
FIG. 4 is a flow diagram illustrating an exemplary method for natural body interaction for mixed or virtual reality applications, according to a preferred embodiment of the invention.

FIG. 4 is a flow diagram illustrating an exemplary method 400 for natural body interaction for mixed or virtual reality applications, according to a preferred embodiment of the invention. In an initial step 401, a composition server 101 (as described previously, referring to FIG. 1) may load a variety of device and tracking configuration data, such as preconfigured parameters to establish a "default mode" or baseline tracking behavior, or using historical data from previous sessions if available. Device tracking may optionally be calibrated 401a if needed, for example if new devices are detected or an arrangement has changed since previous operation, or if a user manually requests calibration (or any other criteria, such as a configured calibration time interval). Devices may then begin tracking a user's torso position and movement 402, providing these readings to the composition server as input data. In a next step 403, composition server 101 may create a virtual "torso joystick" within a software application, to emulate a standard control stick input device in software without needing a hardware device present. In a next step 404, composition server 101 may translate received torso readings from previous steps into movements of the software-based torso joystick, and in a final step 405 may provide these torso joystick movements as user input for further use. In this manner, movement of a user's body may be used to emulate the movements or other behaviors of a control stick, enabling complex and reliable interaction with software applications through natural body movements. By translating these movements into joystick input via composition server 101, this functionality may be added to existing software programs and games that have support for control stick interfaces, without the need for additional configuration.

Figure 5:
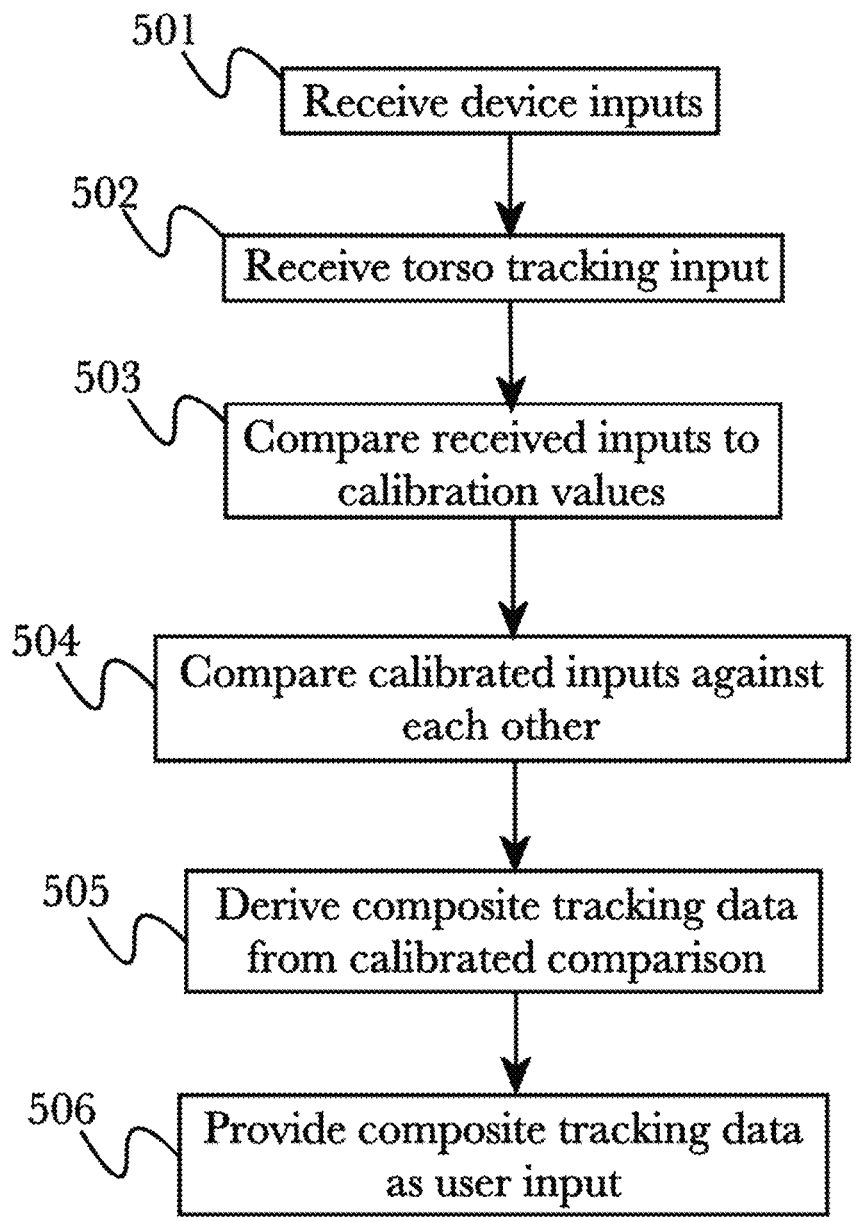
FIG. 5 is a flow diagram illustrating an exemplary method for processing natural body interaction and additional inputs and producing a composite output, according to a preferred embodiment of the invention.

FIG. 5 is a flow diagram illustrating an exemplary method 500 for processing natural body interaction and additional inputs and producing a composite output, according to a preferred embodiment of the invention. In an initial step 501, a composition server 101 may receive a plurality of device inputs, such as motion data from a controller 104 or headset 103, or fitness data from a fitness tracking device 105, or other device input. In a next step 502, composition server 101 may receive a variety of torso tracking input, such as movement data from a headset 103 or torso position or movement tracking via a plurality of tethers 208a-n (as described previously in FIG. 2). In a next step 503, received data may be compared to calibration values to perform data "clean up", for example by discarding erroneous readings or by adjusting readings based on known calibration (such as applying an offset to normalize readings), and in a next step 504 the resulting calibrated readings may be further compared against each other and further refined as necessary (for example, applying an offset or bias to a portion of readings to normalize them relative to other readings, such as having an "axis multiplier" to correct for distorted movement along a particular axis relative to other axes). In a next step 505, these calibrated readings may then be used to derive composite tracking data, such as by utilizing tracking of hands and head to identify complex movements of a user's hands relative to their face, or by combining head and torso movement to identify more complex poses or movements of the user's body, such as leaning in one direction while looking in another, or attempting to hold a specific complex pose such as for yoga or contortion-based games. In a final step 506, composite data may be provided as user input for further use in software applications, for example for use in a gaming application or for use by a connected computing device such as a personal computer or video game console. In this manner, multiple data type or sources may be used to derive more complex and detailed movements and other data, and this may be combined into a single composite input for use in software applications according to their particular configuration (such as for use in a video games designed to accept control stick input, but not designed or readily adaptable to utilize fitness tracker data).

Figure 6A:
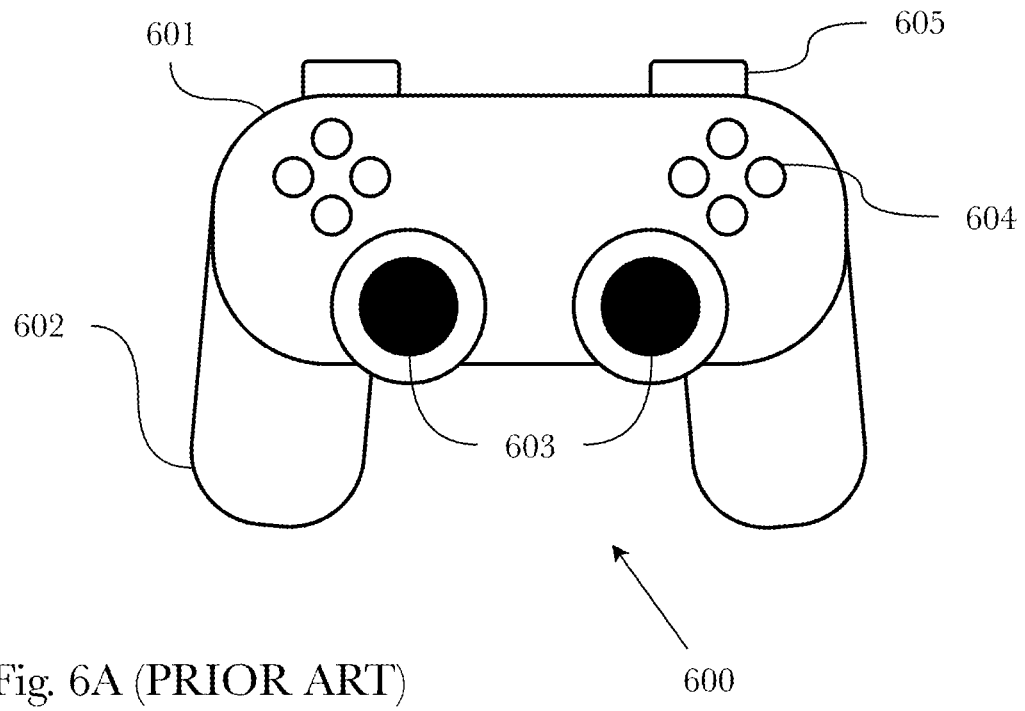
FIGS. 6A & 6B (PRIOR ART) show a representation of a standard dual joystick controller.
Figure 6B:
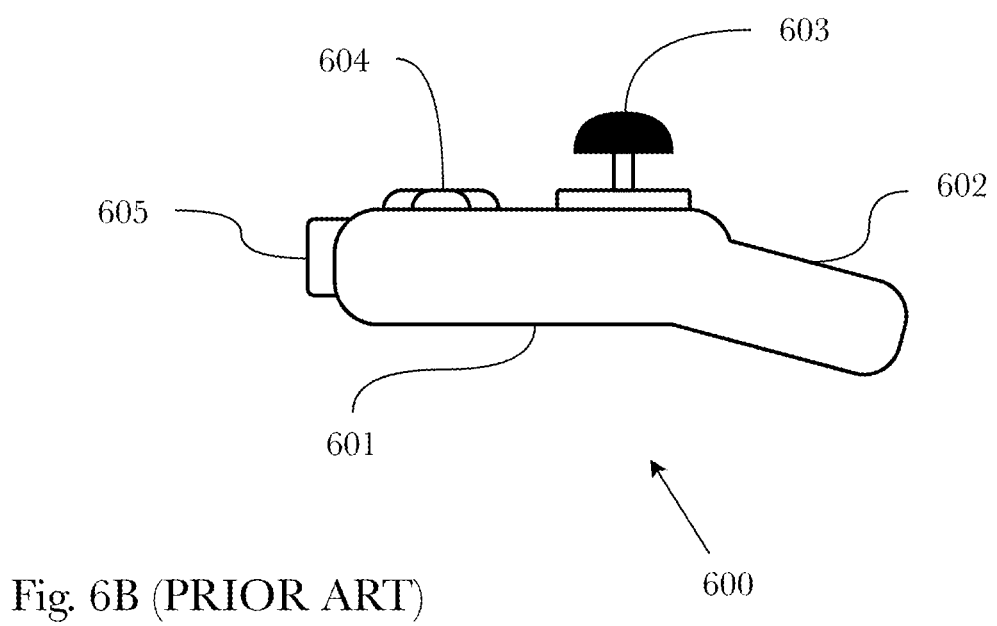

FIGS. 6A & 6B (PRIOR ART) show a representation of a standard dual joystick controller 600. FIG. 6A shows a top view and FIG. 6B shows a side view of such a controller. A standard dual joystick controller, such as a Playstation 4 Dualshock 4 controller or an Xbox One controller, has a single-piece body 601 comprising handles 602, two small joysticks 603 designed to be controlled with the thumbs of each hand, a plurality of buttons 604 which are typically located in front of each joystick, and a plurality of trigger buttons 605 which are typically mounted on the front of the dual joystick controller to mimic triggers as one would find on a handgun or rifle. Dual joystick controllers are typically used while sitting, and require fine motor skill operation of the hands and fingers. Thus, whole body movements interfere with the use of such controllers because the fine motor skills required to operate the controllers are over-ridden or thrown off by gross body movements, particularly vigorous body movements like those that occur during exercise. Accordingly, dual joystick controllers are typically used while stationary, and most often while sitting.

Figure 7:
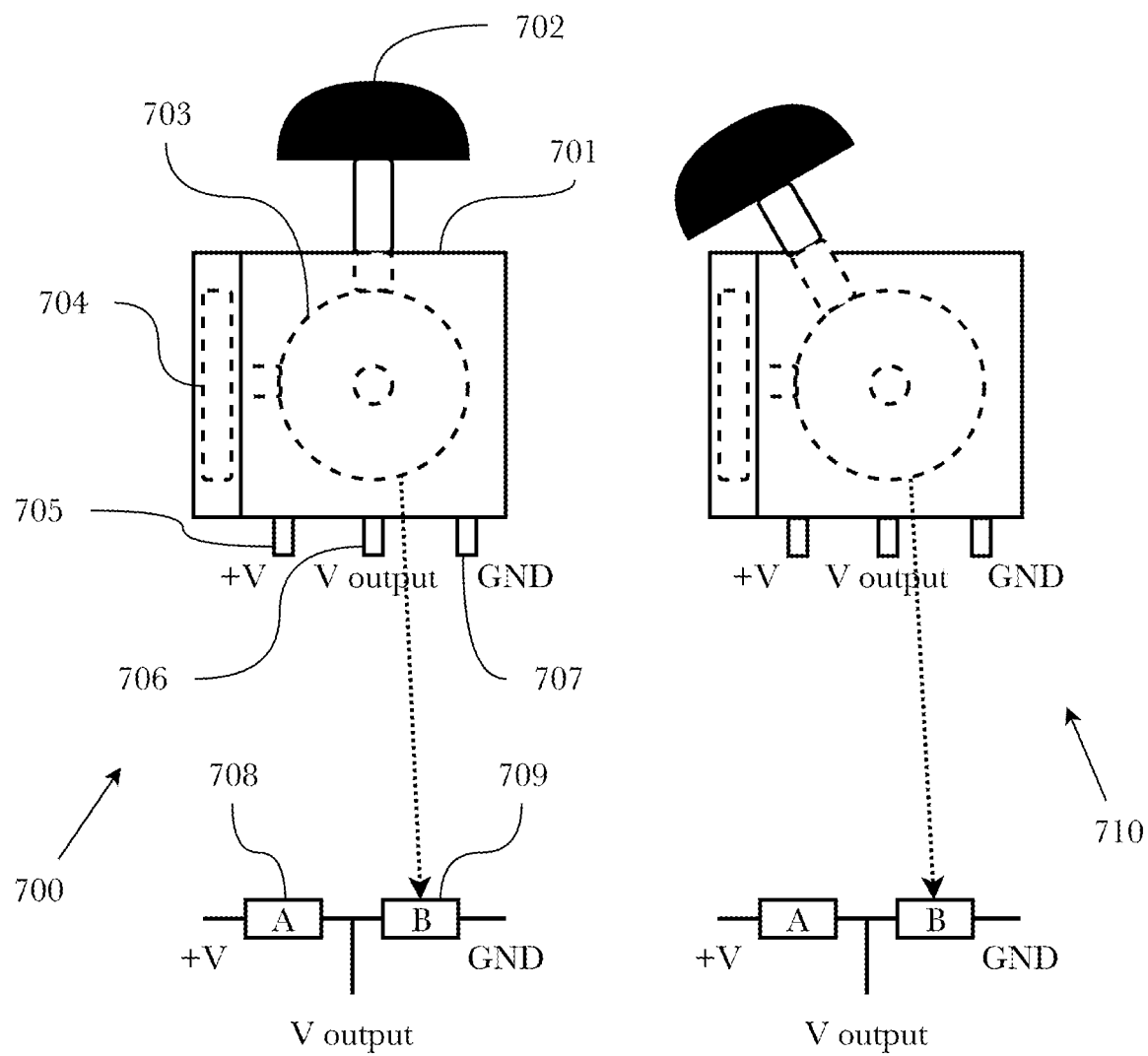
FIG. 7 (PRIOR ART) shows the design and electrical characteristics of a typical thumb joystick as found in a standard dual joystick controller.

FIG. 7 (PRIOR ART) shows the design and electrical characteristics of a typical thumb joystick as found in a standard dual joystick controller. While a typical thumb joystick is shown in this example, this design is fairly standard across all modern joysticks. The thumb joystick controller comprises a housing 701 made of rigid material, typically plastic, a joystick with a mushroom-shaped top 702 typically made of a rubberized material for grip, a first potentiometer 703, 709 mounted parallel with the x-axis of the joystick, and a second potentiometer 704 mounted parallel with the y-axis of the joystick (i.e., perpendicular to the first potentiometer), a reference voltage pin 705, an output voltage pin 706, and a ground pin 707. In the typical usage, a +3.3V to +5V voltage (typical voltages used in computer systems) is applied to the reference voltage pin. The three pins 705, 706, and 707, along with a fixed resistor 708, and the potentiometer 703, 709, act as a voltage splitter. The fixed resistor 708 and potentiometer are matched, such that when the joystick is at rest 700, each resistor drops about half of the voltage applied at the reference voltage pin. For example, for a reference voltage of +5V a fixed resistor of 10KΩ with the potentiometer at rest also of 10KΩ, the voltage would be split equally between the fixed resistor 708 and the potentiometer 703, 709 such that voltage at the output voltage pin 706 would be 2.5V. When the joystick is moved on the x-axis 710, the resistance of the potentiometer is either increased (pushing more voltage to the output voltage pin 706) or decreased (passing more voltage through to the ground pin 708, changing the relationship with the fixed resistor and changing the voltage available at the output voltage pin 706. The same is true of the y-axis, and the different voltages from the x-axis and y-axis are used to determine the location of the joystick. The analog voltages (also known as analog signals) from the x-axis and y-axis are typically converted to digital form (also known as digital signals) using an analog-to-digital converter, typically with an 8-bit or 10-bit resolution, corresponding to a digital value on each axis between 0-255 or 0-1023. is then used for proportional control of a device. The trigger buttons on dual joystick controllers are typically proportional, as are the joysticks, whereas the other buttons on the face of the controller are usually on/off (i.e., binary or I/O) buttons.

Figure 8:
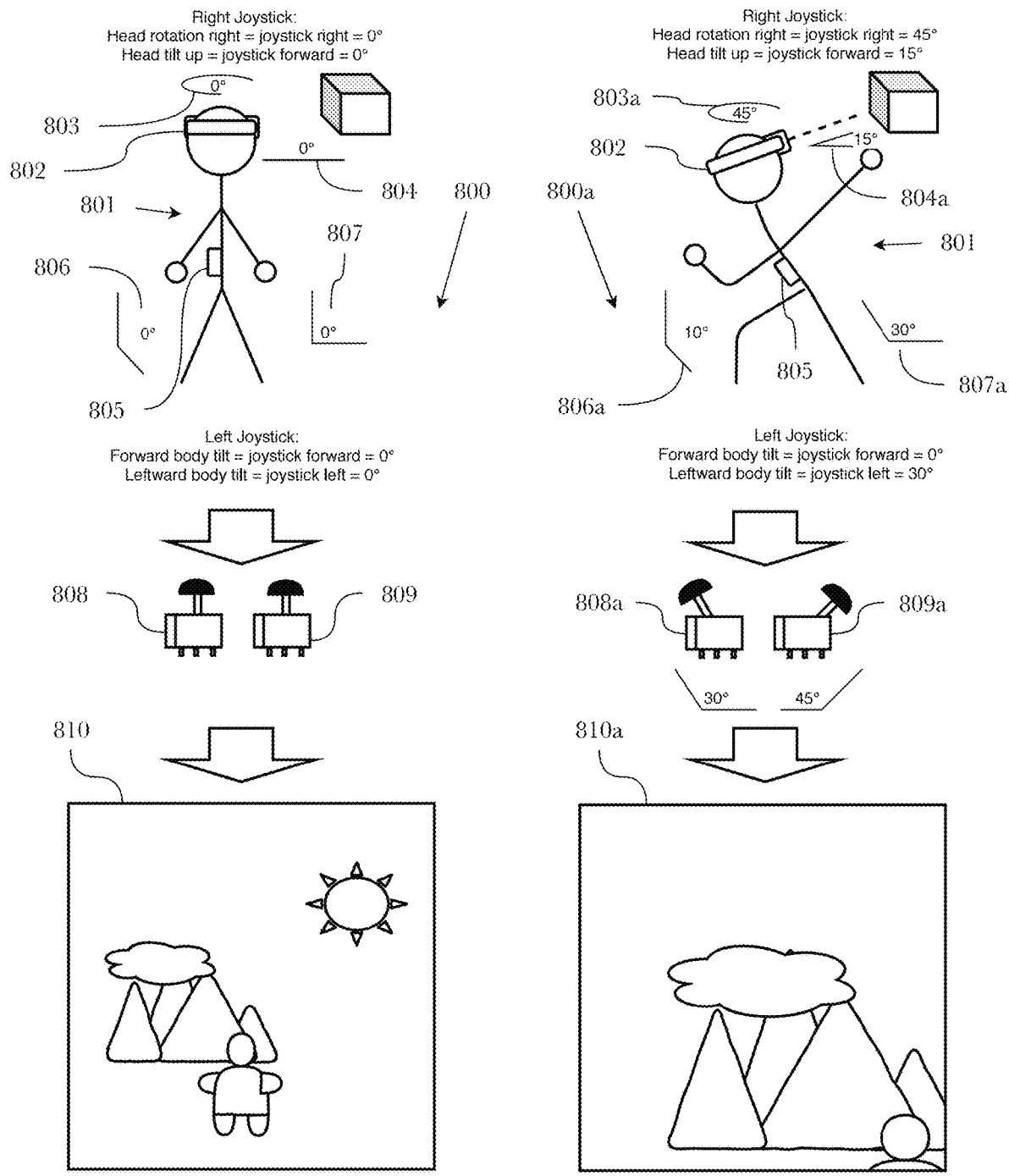
FIG. 8 shows an exemplary embodiment and the relationship between the motion sensors, standard dual joystick controllers, and the resulting image that would be seen when using the embodiment to control a computer game.

FIG. 8 shows an exemplary embodiment and the relationship between the motion sensors, standard dual joystick controllers, and the resulting image that would be seen when using the embodiment to control a computer game. The user 801 wears a motion sensor on the head 802 and a motion sensor worn on the torso 805. In this example, the user 801 is playing a first-person virtual reality game. The motion sensor worn on the head 802 is configured to track both a left/right rotation of the head 803 (corresponding to the user looking left or right) and an up/down tilt of the head 804 (corresponding to the user 801 looking up or down). The motion sensor worn on the torso 805 is configured to track a left/right torso lean 806 (corresponding to the user 801 leaning left or right) and a forward/backward torso tilt 807 (corresponding to the user 801 leaning forward or backward). The version on the left side 800 shows the user 801 standing straight up, corresponding to both the left joystick 808 and the right joystick 809 at rest in the upright position, with an initial in-game image showing a scene 810 containing a person, mountains, clouds, and a sun. The version on the right side 800a shows the user interacting with the game by leaning and tilting his body/torso and by rotating and tilting his head. The user 801 is leaning to the left at a 30° lean 807a, and leaning forward at a 10° tilt 806a. These body movements correspond to a left joystick lean of 30° 808a and a left joystick forward tilt of 10° (not shown), causing the user's in-game avatar to move left (objects in image appear to shift to the right) and slightly forward (objects in image appear to become larger). Simultaneously, the user's head is rotated 45° to the right 803a and 15° upward 804a. These head movements correspond to a right joystick lean of 45° 809a and a right joystick backward tilt (representing looking upward) of 10° (not shown), causing the user's in-game view 810a (through the eyes of the in-game avatar) to move right (objects in image appear to shift to the left) and slightly upward (objects in image appear to move slightly downward). From this example, it can be seen that the user's 801 perception of the virtual reality scene will depend on two separate sets of movements, one for the location of the in-game avatar's body being controlled by a virtual joystick corresponding to the user's 801 torso, and a separate one for the in-game avatar's view being controlled by a virtual joystick corresponding to the user's head. The combination of these two virtual joysticks determines the in-game perspective and is equivalent to the use of dual joysticks on a standard dual joystick controller.

To convert the virtual joystick outputs to a standard joystick control signal, one simply needs to know the analog voltages and/or digital values accepted by the device to be controlled and map the virtual joystick outputs to those analog voltages and/or digital values. This mapping can be pre-programmed into the system or can be done automatically via software (e.g., the system can convert or map the virtual joystick outputs proportionally to the expected device inputs). The connection with the device to be controlled can be either wired or wireless. With wired connections, many devices use standard universal serial bus (USB) inputs, in which case digital values from the virtual joystick outputs can be transferred to the device to be controlled using standard USB hardware and protocols. In the case of wireless control, a connection is typically made via a Bluetooth™ or Wi-Fi™ adapter, and digital values are transferred wirelessly.

In some embodiments, the motion sensor worn on the head 802 may comprise a viewing screen in the manner of a virtual reality headset. However, it is important to note that virtual reality headsets do not operate in the manner of the invention herein described. A virtual reality headset will contain motion sensors, but can only represent one of a plurality of joystick inputs. Further, the motion sensor worn on the head 802 is not required to have a viewing screen, thus making it lighter and more compatible with the vigorous movements of exercise. In some embodiments, the motion sensors will not be worn on the head or body, and may be an externally-mounted devices such as a cameras that tracks head and body movements.

Figure 13:
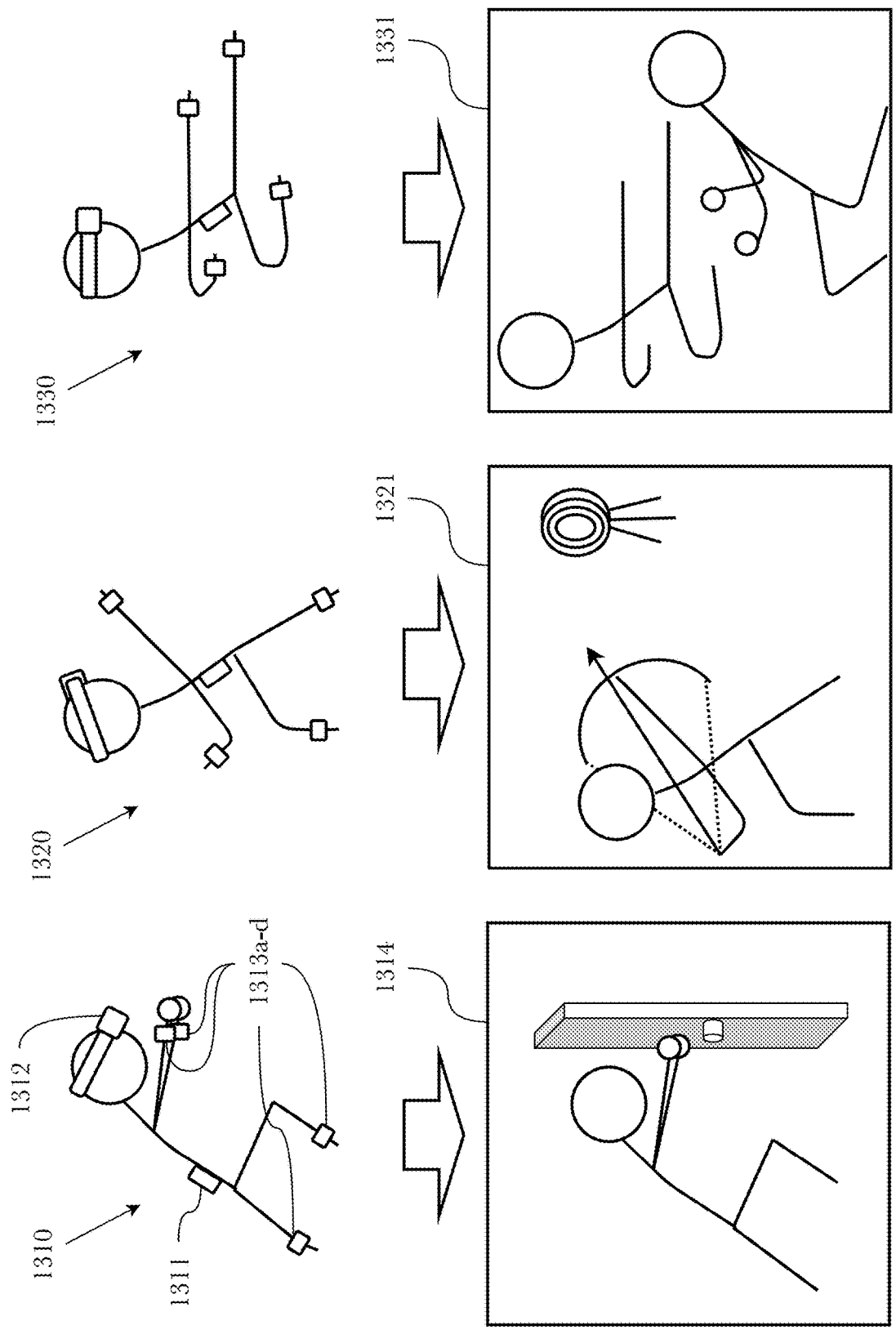
FIG. 13 shows another exemplary embodiment in which additional sensors are used to detect arm and leg movements.

FIG. 13 shows another exemplary embodiment in which additional sensors are used to detect arm and leg movements. The detection system in this embodiment comprises a body motion sensor 1311, a head motion sensor 1312, and motion sensors for each arm and leg 1313a-d. The body motion sensor 1311 and head motion sensor 1312 may be used as dual joystick inputs, as in previous embodiments, or may be used to detect the location, orientation, and movement of the head and body in three-dimensional (3D) space. The arm and leg sensors 1313a-d are additional sensor inputs that detect the location, orientation, and movement of the arms and legs either in 3D space or relative to the body motion sensor 1311, the head motion sensor 1312, and to each other arm and leg motion sensor 1313a-d. All of the sensors may be used to detect the location, orientation, and movement of their relative body parts through several means. In one aspect, each motion sensor 1311, 1312, 1313a-d may comprise a wireless transmitter/receiver, and measurement devices such as accelerometers, gyroscopes, and electronic magnetic compasses, and one of the motion sensors (e.g. the body motion sensor 1311) may act as a central processor that operates to coordinate signals and data from all of the other devices. Using signals from the wireless transmitter in each motion sensor 1311, 1312, 1313a-d, central processor may establish an initial location and orientation at rest for each measurement device. Based on the initial position at rest and data inputs from each measurement device, the central processor may calculate the difference in location, orientation, and movement of each sensor from its at-rest location and orientation. From these differences, the central processor may then calculate a relative position of each motion sensor 1311, 1312, 1313a-d from the others, and determine the position of the body part associated with each motion sensor 1311, 1312, 1313a-d. Alternatively, each motion sensor 1311, 1312, 1313a-d may further comprise a timing device such as a quartz clock, and may periodically send a signals to each other motion sensor 1311, 1312, 1313a-d via its wireless transmitter that includes time information. Based on the time information and its own timing device, each motion sensor 1311, 1312, 1313a-d may determine a distance from itself to the motion sensor which sent the signal with the time information, and may transmit those distances to the central processor. The central processor, using the distance data from each motion sensor to each of the others, can use triangulation to determine the locations of each motion sensor 1311, 1312, 1313a-d relative to the central processor and relative to all other motion sensors. Other methods of determining the location of the motions sensors 1311, 1312, 1313*a-d* may be used, such as external cameras that image the sensors from various angles and calculate the location, orientation, and movement of each sensor relative to the various cameras.

The various illustrated scenarios 1310, 1320, 1330 demonstrate exemplary uses of the above-described embodiment in capturing and using full-body motion in virtual reality (VR) gaming, although non-gaming VR uses and non-VR uses are possible. The scenario in 1310 shows the real-life movements of a person using the system, which are translated through the use of the motion sensors 1311, 1312, 1313*a-d* into an action in the virtual reality environment. In this scenario, the person mimics pushing a door in real life, which is translated in to a door-pushing movement in the virtual reality environment 1314. The scenario in 1320 shows a person mimicking drawing a bow and arrow, which is translated to a bow and arrow shooting movement in the virtual reality environment 1321. The scenario in 1330 shows a person performing a jumping side kick martial arts movement, which is translated to a jumping side kick martial arts movement in the virtual reality environment 1331.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 9:
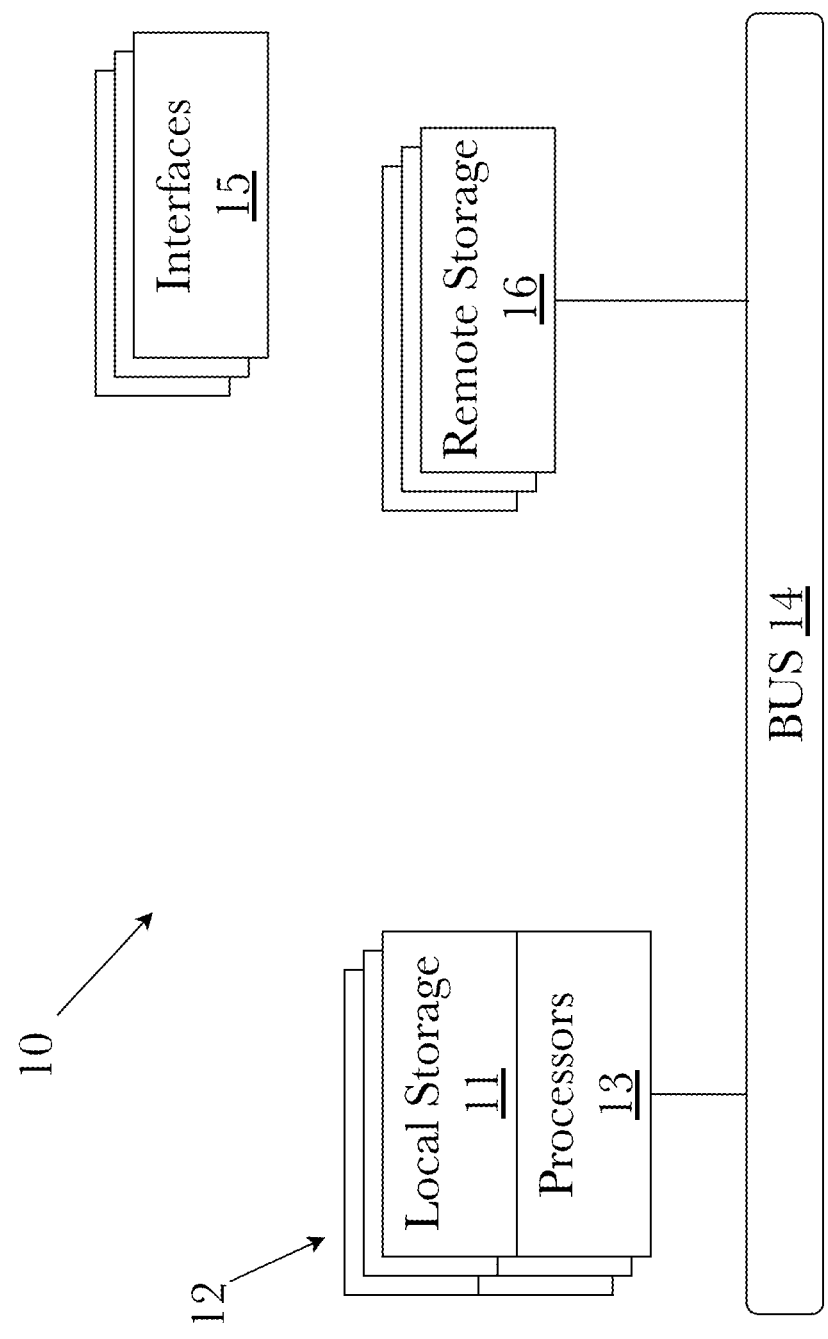
FIG. 9 is a block diagram illustrating an exemplary hardware architecture of a computing device used in an embodiment of the invention.

Referring now to FIG. 9, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 9 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 10:
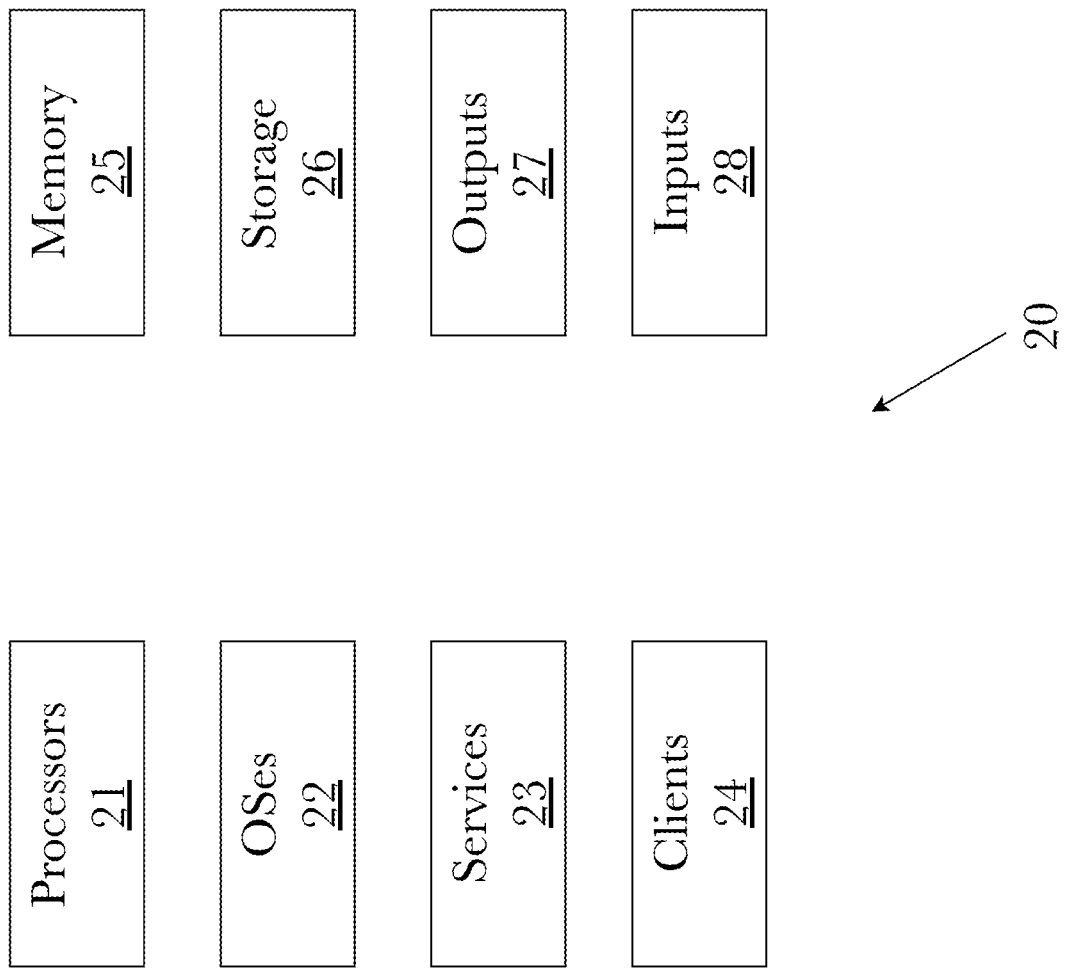
FIG. 10 is a block diagram illustrating an exemplary logical architecture for a client device, according to an embodiment of the invention.

In some embodiments, systems according to the present invention may be implemented on a standalone computing system. Referring now to FIG. 10, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, userspace common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 9). Examples of storage devices 26 include flash memory, magnetic hard drive, CD-ROM, and/or the like.

Figure 11:
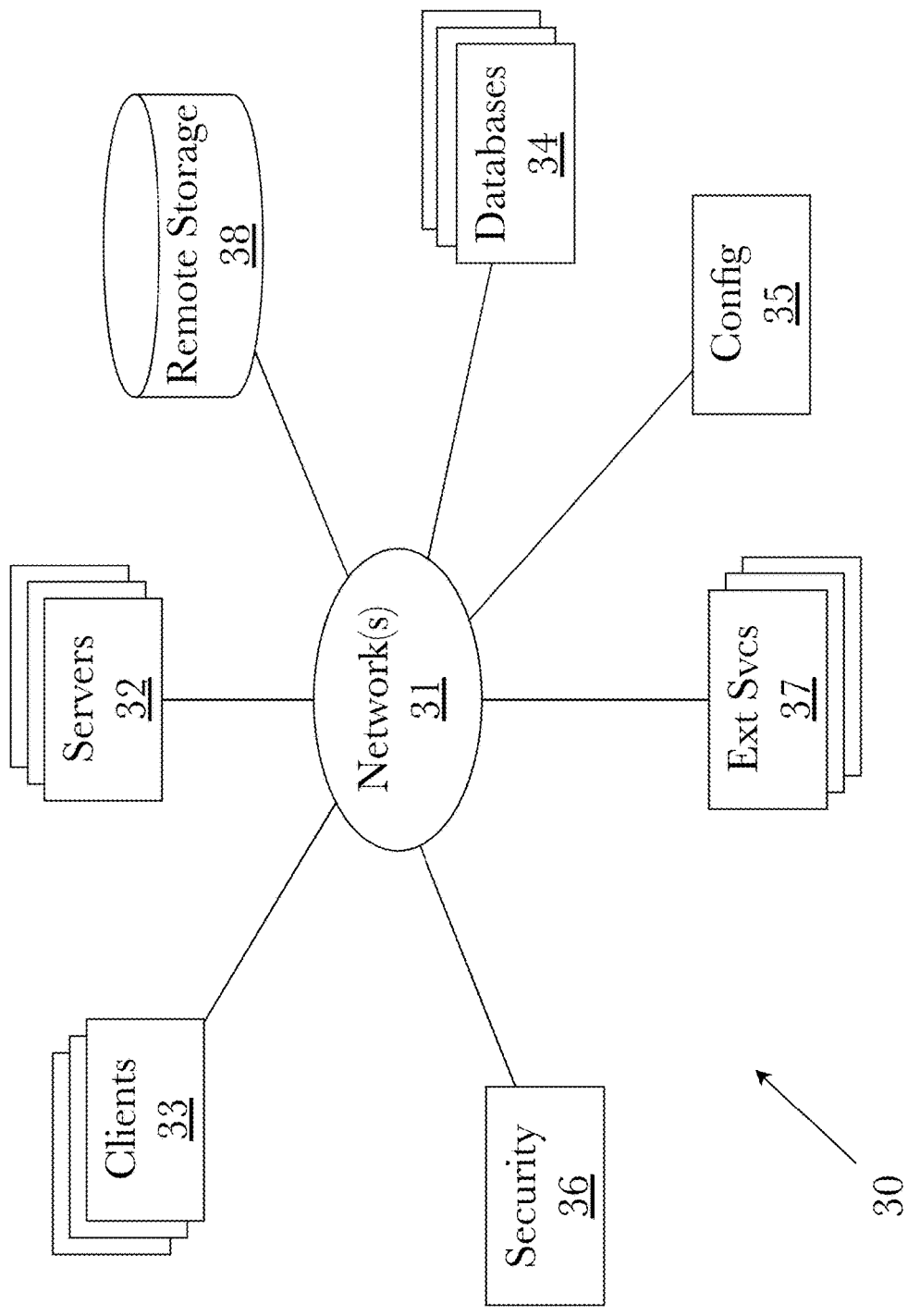
FIG. 11 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 11, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 10. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 12:
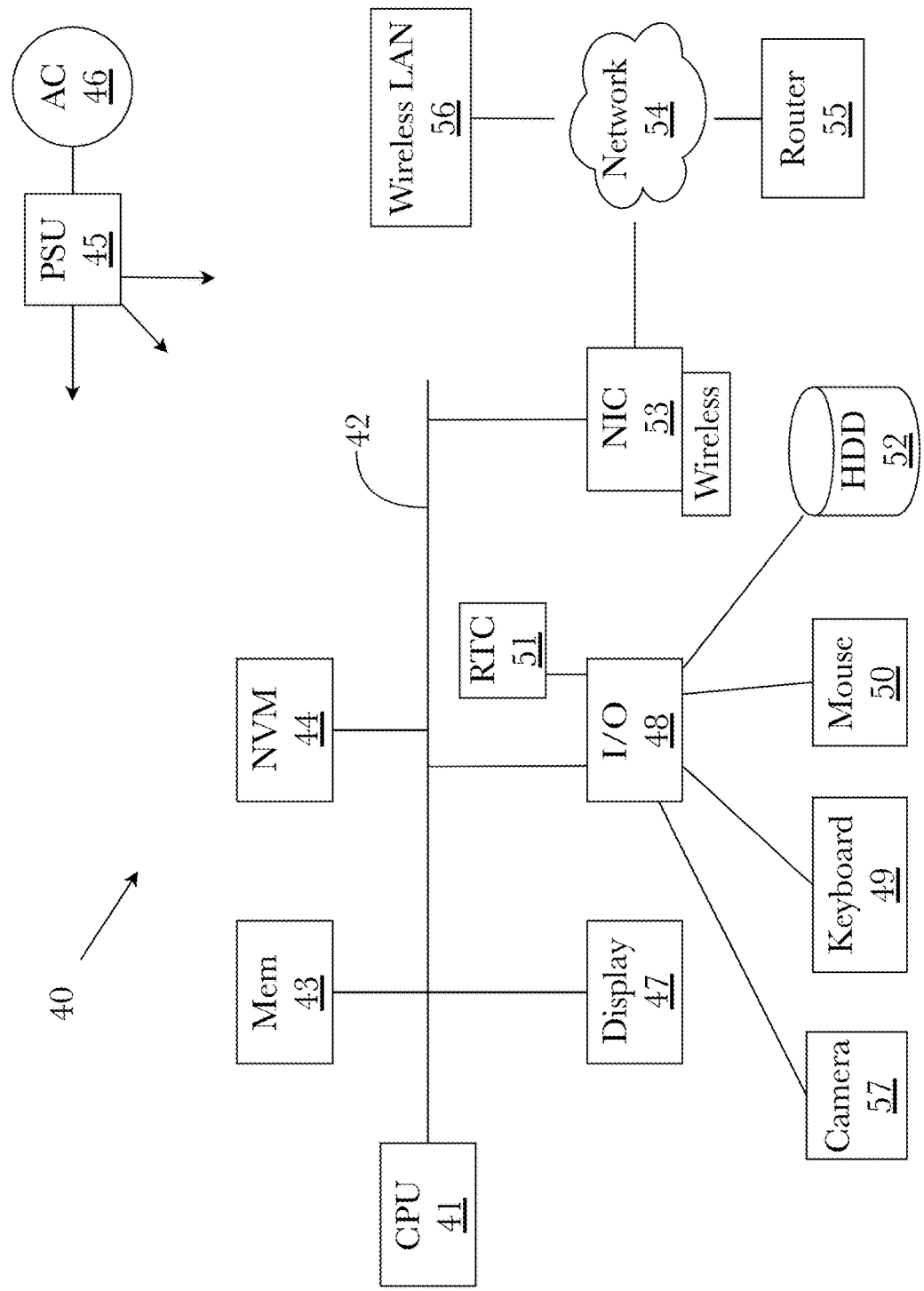
FIG. 12 is another block diagram illustrating an exemplary hardware architecture of a computing device used in various embodiments of the invention.

FIG. 12 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, a camera or a plurality of cameras 57, and real-time clock 51. NIC 53 connects to network 54, which may be connected to or serviced by a router 55 or wireless local area network 56 or both, and the network 54 may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for full body movement control of dual joystick operated devices, comprising:
   a first motion sensing device configured to detect motion comprising a lean angle and a tilt angle of the torso of a user and transmit a first data stream to a composition server; and
   a second motion sensing device configured to detect motion comprising a rotation angle and tilt angle of the head of the user and transmit a second data stream to the composition server;
   the composition server comprising at least a plurality of programming instructions stored in a memory and operating on a processor of a network-connected computing device and configured to:
      receive the first data stream from the first motion sensing device;
      receive the second data stream from the second motion sensing device;
      create a first virtual joystick output wherein the lean angle and the tilt angle of the torso of the user corresponds to a direction of a first joystick;

create a second virtual joystick output wherein the rotation angle and tilt angle of the head of the user corresponds to a direction of a second joystick;
convert each virtual joystick output into a format that would be recognized as a standard joystick output by a dual joystick operated device.

2. The system of claim 1, wherein the dual joystick operated device is a computer game.

3. The system of claim 2, wherein:
the lean angle of the first virtual joystick controls left and right movement of an in-game avatar and the tilt angle of the first virtual joystick controls forward and backward movement of the in-game avatar; and
the rotation angle of the second virtual joystick controls the left and right view control in the game and the tilt angle of the first virtual joystick controls up and down view control in the game.

4. The system of claim 1, wherein the dual joystick operated device is a radio-controlled aircraft or drone.

5. A method for full body movement control of dual joystick operated devices, comprising the steps of:
capturing data from a first motion sensing device configured to detect motion comprising a lean angle and a tilt angle of the torso of a user and transmitting a first data stream to a composition server;
capturing data from a second motion sensing device configured to detect motion comprising a rotation angle and tilt angle of the head of the user and transmitting a second data stream to the composition server;
using the composition server comprising at least a plurality of programming instructions stored in a memory and operating on a processor of a network-connected computing device to perform the additional steps of:
receiving the first data stream from the first motion sensing device;
receiving the second data stream from the second motion sensing device;
creating a first virtual joystick output wherein the lean angle and the tilt angle of the torso of the user corresponds to a direction of a first joystick;
creating a second virtual joystick output wherein the rotation angle and tilt angle of the head of the user corresponds to a direction of a second joystick; and
converting each virtual joystick output into a format that would be recognized as a standard joystick output by a dual joystick operated device.

6. The method of claim 5, wherein the dual joystick operated device is a computer game.

7. The method of claim 6, wherein:
the lean angle of the first virtual joystick controls left and right movement of an in-game avatar and the tilt angle of the first virtual joystick controls forward and backward movement of the in-game avatar; and
the rotation angle of the second virtual joystick controls the left and right view control in the game and the tilt angle of the first virtual joystick controls up and down view control in the game.

8. The method of claim 1, wherein the dual joystick operated device is a radio-controlled aircraft or drone.

* * * * *